(12) United States Patent
Lu et al.

(10) Patent No.: US 11,112,316 B2
(45) Date of Patent: Sep. 7, 2021

(54) OPTICAL FIBER TEMPERATURE SENSOR

(71) Applicant: Huazhong University of Science and Technology, Hubei (CN)

(72) Inventors: Ping Lu, Hubei (CN); Wenjun Ni, Hubei (CN); Deming Liu, Hubei (CN); Xin Fu, Hubei (CN); Hao Liao, Hubei (CN)

(73) Assignee: Huazhong University of Science and Technology, Hubei (CN)

( * ) Notice: Subject to any disclaimer, the term of this patent is extended or adjusted under 35 U.S.C. 154(b) by 422 days.

(21) Appl. No.: 16/323,649

(22) PCT Filed: Feb. 11, 2018

(86) PCT No.: PCT/CN2018/076219
§ 371 (c)(1),
(2) Date: Feb. 6, 2019

(87) PCT Pub. No.: WO2019/148539
PCT Pub. Date: Aug. 8, 2019

(65) Prior Publication Data
US 2020/0292397 A1    Sep. 17, 2020

(30) Foreign Application Priority Data

Jan. 30, 2018 (CN) .......................... 201810085724.9

(51) Int. Cl.
*G01J 5/00* (2006.01)
*G01K 11/32* (2021.01)
*G01J 5/08* (2006.01)

(52) U.S. Cl.
CPC ................ *G01K 11/32* (2013.01); *G01J 5/08* (2013.01); *G01J 5/0821* (2013.01); *G01J 5/0896* (2013.01)

(58) Field of Classification Search
CPC .. G01D 5/268; G01M 11/085; G01M 5/0091; G01L 9/0077; G01J 5/0821; G01J 5/08; G01J 5/0896; G01J 5/0014
See application file for complete search history.

(56) References Cited

U.S. PATENT DOCUMENTS

| | | | |
|---|---|---|---|
| 7,005,669 B1 * | 2/2006 | Lee | G02B 6/12011 257/21 |
| 7,425,093 B2 * | 9/2008 | Wickersham, Jr. | C23C 14/3407 356/314 |
| 2003/0118075 A1 | 6/2003 | Schweiger et al. | |

(Continued)

FOREIGN PATENT DOCUMENTS

| | | |
|---|---|---|
| CN | 103175628 A | 6/2013 |
| CN | 106644154 A | 5/2017 |

(Continued)

OTHER PUBLICATIONS

International Search Report and Written Opinion issued in PCT/CN2018/076219, dated Oct. 17, 2018.

*Primary Examiner* — Gail Kaplan Verbitsky
(74) *Attorney, Agent, or Firm* — Hamre, Schumann, Mueller & Larson, P.C.

(57) ABSTRACT

An optical fiber temperature sensor includes a broadband light source, a first optical fiber patch cord, a first single-mode optical fiber, a single-hole twin-core eccentric core optical fiber, a second single-mode optical fiber, a second optical fiber patch cord, and an optical spectrum analyzer.

7 Claims, 3 Drawing Sheets

(56) References Cited

U.S. PATENT DOCUMENTS

| | | | |
|---|---|---|---|
| 2005/0129088 A1 | 6/2005 | Rajendran et al. | |
| 2008/0001062 A1* | 1/2008 | Gunn | G02B 6/12007 250/206 |
| 2008/0144698 A1* | 6/2008 | Cloutier | G01K 11/3206 374/161 |
| 2011/0090567 A1* | 4/2011 | Tischhauser | G01J 3/26 359/578 |
| 2018/0321442 A1* | 11/2018 | Yang | G02B 6/262 |

FOREIGN PATENT DOCUMENTS

| | | |
|---|---|---|
| CN | 106959172 A | 7/2017 |
| CN | 107014518 A | 8/2017 |

* cited by examiner

OPTICAL FIBER TEMPERATURE SENSOR

BACKGROUND OF THE INVENTION

Technical Field

The present invention relates to the field of optical fiber temperature measurement technology, and more particularly to an optical fiber temperature sensor.

Description of the Related Art

Accurate temperature measurement is very important in engineering applications such as aerospace, high-power stabilized lasers and high precision CNC machine tools. The optical fiber temperature sensor mainly detects the change of the ambient temperature, and has advantages of being immune to electromagnetic interference, strong in corrosion resistance, easy to manufacture, low in cost, fast in response and high in detection sensitivity, compared with the ordinary electric sensor.

In order to meet the needs of large-dynamic-range and high-resolution temperature measurement in engineering applications, researchers have conducted a lot of research on fiber temperature measurement. In the aspect of large-dynamic-range fiber temperature measurement, temperature measurement based on a special optical fiber micro-structure device is proposed: an inline interference structure based on suspended core fiber realizes large-dynamic-range temperature measurement from 20° C. to 1100° C., but its temperature sensitivity is only 11 pm/° C., and the sensor size is 2.4 cm; an inline interference structure based on air-core fiber offset realizes a sensor size of 125 μm and large-dynamic-range temperature measurement from 200° C. to 900° C., but its temperature sensitivity is only 41.9 pm/° C. Therefore, the methods using special fiber micro-structure devices may generally achieve miniaturization and large-dynamic-range temperature measurement, but their measurement sensitivities are relatively low, limiting high-resolution fiber temperature measurement. In the aspect of high-resolution fiber temperature measurement, a measurement method, in which the thermal-sensitive material is coated on the optical fiber sensing structure and power intensity demodulation is performed, is proposed: a temperature sensor based on intensity demodulation, in which graphene is coated on the micro-nano fiber, may have a sensitivity of up to 0.1052 dB/° C., and a temperature sensor, in which polymer is coated on the fiber microcavity, may have a sensitivity of 0.13 dB/° C. The coating of two different materials can achieve a minimum detectable resolution of less than 0.01° C. Therefore, the method of coating the optical fiber sensing structure with the heat-sensitive material achieves an effect of temperature sensitization and thus achieves the purpose of high-resolution fiber temperature measurement. However, this method limits the large-dynamic-range fiber temperature measurement. In summary, the existing optical fiber temperature sensor cannot achieve the goal of high-resolution and large-dynamic-range measurement while miniaturizing the sensing structure.

SUMMARY OF THE INVENTION

In view of the above-described defects in the art, the present invention aims to solve the technical problem that the existing optical fiber temperature sensor cannot achieve the goal of high-resolution and large-dynamic-range measurement while miniaturizing the sensing structure.

In order to achieve the above objective, the present invention provides an optical fiber temperature sensor, comprising: a broadband light source, a first optical fiber patch cord, a first single-mode optical fiber, a single-hole twin-core eccentric core optical fiber, a second single-mode optical fiber, a second optical fiber patch cord and an optical spectrum analyzer;

two ends of the first optical fiber patch cord are respectively connected to an output end of the broadband light source and an end of the first single-mode optical fiber, the broadband light source is used to provide wide-spectrum light, and the first optical fiber patch cord is used to introduce the wide-spectrum light into the first single-mode optical fiber; the other end of the first single-mode optical fiber is connected to an end of the single-hole twin-core eccentric core optical fiber, with the connection point as a first fusion splice point; the other end of the single-hole twin-core eccentric core optical fiber is connected to an end of the second single-mode optical fiber, with the connection point as a second fusion splice point, and the first fusion splice point, the single-hole twin-core eccentric core optical fiber and the second fusion splice point are sequentially connected to form an inline Mach-Zehnder interference structure and generate an anti-resonance effect in the broad-spectrum light, wherein impacts of the inline Mach-Zehnder interference structure and the anti-resonance effect on the broad-spectrum light are each related to an ambient temperature of the optical fiber temperature sensor; the other end of the second single-mode optical fiber is connected to an end of the second optical fiber patch cord; the other end of the second optical fiber patch cord is connected to the optical spectrum analyzer, and the second optical fiber patch cord is used to introduce an optical signal formed by superimposing the inline Mach-Zehnder interference structure and the anti-resonance effect into the optical spectrum analyzer, so that the optical spectrum analyzer determines an ambient temperature of the optical fiber temperature sensor according to the optical signal.

Optionally, the optical spectrum analyzer performs fast Fourier filtering on the optical signal to filter a comb spectrum formed by interference between a high-order cladding mode and a core mode out of the superposed spectrum, and since the high-order cladding mode has a thermo-optic coefficient greater than that of a low-order cladding mode, the high-order comb spectrum filtered out by the fast Fourier filtering method is capable of achieving high temperature sensitivity; the optical spectrum analyzer performs Gaussian fitting on the optical signal, and since temperature sensitivity resulting from the anti-resonance effect depends on a thermo-optic coefficient of a cladding of the single-hole twin-core eccentric core optical fiber and the thermo-optic coefficient of the cladding is very low, the temperature sensitivity resulting from the anti-resonance effect is low;

the optical spectrum analyzer performs fast Fourier filtering and Gaussian fitting on the optical signal respectively to determine a minimum point wavelength in the comb spectrum and a resonant wavelength, and the optical spectrum analyzer determines an ambient temperature of the optical fiber temperature sensor according to a relationship between the minimum point wavelength in the comb spectrum and temperature as well as a relationship between the resonant wavelength in the optical signal and temperature, in which a sensitivity resulting from change of the minimum point wavelength in the comb spectrum with the ambient temperature is a first temperature sensitivity, a sensitivity resulting from change of the resonant wavelength in the optical signal with the ambient temperature is a second temperature sensitivity, the first temperature sensitivity is greater than the second temperature sensitivity and the two are of different orders of magnitude, enabling the optical fiber temperature sensor to be suitable for high-resolution and large-dynamic-range temperature measurement.

Optionally, two ends of the single-hole twin-core eccentric core optical fiber are respectively connected to the other end of the first single-mode optical fiber and the end of the second single-mode optical fiber in a cladding alignment fusion splice manner, and the first fusion splice point and the second first fusion splice point are both collapsed fusion splice points.

Optionally, the single-hole twin-core eccentric core optical fiber has an air hole located at a central position thereof, and the air hole has a diameter of 20 μm to 50 μm.

Optionally, two cores of the single-hole twin-core eccentric core optical fiber are respectively suspended on an inner wall of the cladding and inserted in the cladding, and the two cores are disposed on two sides of the air hole.

Optionally, the cores and the cladding of the single-hole twin-core eccentric core optical fiber have the same diameters as that of a common single-mode fiber.

Optionally, the single-hole twin-core eccentric core optical fiber has a length of 0.8 mm~1.2 mm.

In general, by comparing the above technical solution of the present inventive concept with the prior art, the present invention has the following beneficial effects:

(1) in an optical fiber temperature sensor integrating the inline Mach-Zehnder interference structure and the anti-resonance effect of the optical fiber provided in the present invention, high-resolution and large-dynamic-range simultaneous measurement can be achieved since the comb spectrum and the resonant wavelength formed by different mechanisms have different sensitivities to temperature.

(2) the single-hole twin-core eccentric core optical fiber provided in the present invention can form the inline Mach-Zehnder interference structure and anti-resonance effect in a short fiber length range, and thus a miniaturized optical fiber temperature sensor can be implemented.

(3) in an optical fiber temperature sensor achieving high-resolution and large-dynamic-range simultaneous measurement as well as size miniaturization provided in the present invention, a single inline structure is adopted, and compared with a conventional optical fiber interferometer which requires a coupler and an optical fiber microstructure requiring coating sensitization, the optical fiber temperature sensor has the advantages of simple structure, low price, and easy manufacture.

BRIEF DESCRIPTION OF THE DRAWINGS

In all figures, the same elements or structures are denoted by the same reference numerals, in which.

Figure 1:
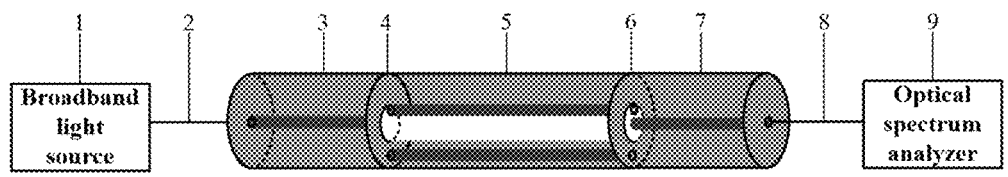
FIG. 1 is a schematic structural diagram of an optical fiber temperature sensor achieving high-resolution and large-dynamic-range simultaneous measurement as well as size miniaturization according to Embodiment 1 of the present invention.

1: broadband light source, 2: first optical fiber patch cord, 3: first single-mode optical fiber, 4: first fusion splice point, 5: single-hole twin-core eccentric core optical fiber, 6: second fusion splice point, 7: second single-mode optical fiber, 8: second optical fiber patch cord, 9: optical spectrum analyzer.

DETAILED DESCRIPTION OF THE EMBODIMENTS

For clear understanding of the objectives, features and advantages of the present invention, detailed description of the present invention will be given below in conjunction with accompanying drawings and specific embodiments. It should be noted that the embodiments described herein are only meant to explain the present invention, and not to limit the scope of the present invention. Furthermore, the technical features related to the embodiments of the invention described below can be mutually combined if they are not found to be mutually exclusive.

The present invention provides an optical fiber temperature sensor capable of achieving high-resolution and large-dynamic-range simultaneous measurement by integrating the inline Mach-Zehnder interference structure and the anti-resonance effect of the optical fiber as well as size miniaturization, the purpose of which is to form the inline Mach-Zehnder interference structure and the anti-resonance effect by the single-mode optical fibers and the single-hole twin-core eccentric core optical fiber, and the inline Mach-Zehnder interference structure and the anti-resonance effect are integrated on the single-hole twin-core eccentric core optical fiber; by respectively performing fast Fourier filtering and Gaussian fitting on the superimposed spectrum formed by the inline Mach-Zehnder interference structure and the anti-resonance effect and then performing wavelength demodulation on the spectrums processed by the above two methods, an optical fiber temperature sensor capable of achieving high-resolution and large-dynamic-range simultaneous measurement is implemented.

In order to achieve the above objective, the present invention provides an optical fiber temperature sensor capable of achieving high-resolution and large-dynamic-range simultaneous measurement by integrating the inline Mach-Zehnder interference structure and the anti-resonance effect of the optical fiber as well as size miniaturization, comprising: a broadband light source, a first optical fiber patch cord, a first single-mode optical fiber, a first fusion splice point, a single-hole twin-core eccentric core optical fiber, a second fusion splice point, a second single-mode optical fiber, a second optical fiber patch cord and a optical spectrum analyzer;

wherein two ends of the first optical fiber patch cord are respectively connected to an output end of the broadband light source and a first end of the first single-mode optical fiber; a second end of the first single-mode optical fiber is connected to a first end of the single-hole twin-core eccentric core optical fiber; a second end of the single-hole twin-core eccentric core optical fiber is connected to a first end of the second single-mode optical fiber; a second end of the second single-mode optical fiber is connected to a first end of the second optical fiber patch cord; a second end of the second optical fiber patch cord is connected to an input end of the optical spectrum analyzer; two connection points of the single-hole twin-core eccentric core optical fiber and the first and second single-mode optical fibers are respectively the first fusion splice point and the second fusion splice point.

Further, the first fusion splice point, the single-hole twin-core eccentric core optical fiber and the second fusion splice point are sequentially connected to form the inline Mach-Zehnder interference structure; the broadband light source, the optical spectrum analyzer and the inline Mach-Zehnder interference structure constitute a Mach-Zehnder interferometer; the anti-resonance effect and the inline Mach-Zehnder interference structure are integrated on the single-hole twin-core eccentric core optical fiber; by respectively performing fast Fourier filtering and Gaussian fitting on the superimposed spectrum formed by the inline Mach-Zehnder interference structure and the anti-resonance effect and then performing wavelength demodulation on the spectrums processed by the above two methods, high-resolution and large-dynamic-range simultaneous measurement can be achieved.

The first single-mode optical fiber and the second single-mode optical fiber are connected to the single-hole twin-core eccentric core optical fiber in a cladding alignment fusion splice manner; and the purpose of adopting the cladding alignment fusion splice manner is to cause the air hole of the single-hole twin-core eccentric core optical fiber to collapse at the first fusion splice point and the second fusion splice point, thereby exciting a partial cladding mode in the single-hole twin-core eccentric core optical fiber and forming an anti-resonance effect. Thus, the cladding mode and the core mode exist in the single-hole twin-core eccentric core optical fiber and the coupling between the cladding mode and the core mode exist is achieved when they are transmitted to the second fusion splice point, so that the cladding mode and the core mode transmitted in the single-hole twin-core eccentric core optical fiber may generate interference at the second fusion splice point and are superimposed with the anti-resonance effect to be transmitted to the second fusion splice point.

Different loss peaks of the single-hole twin-core eccentric core optical fiber results from the anti-resonance effect formed by a double-air-layer structure consisting of the air hole, the optical fiber cladding and the outside air in the single-hole twin-core eccentric core optical fiber, and the principle of the anti-resonance effect is similar to that of the high-precision Fabry Perot interferometer, so that four dominant loss peaks can be displayed in the same window of the optical spectrum analyzer; the resulting four loss peaks are superimposed on the comb spectrum generated by the inline Mach-Zehnder structure, thereby showing, on the optical spectrum analyzer, a transmission spectrum formed by superposition of the four loss peaks and the comb spectrum.

After the single-mode optical fibers and the single-hole twin-core eccentric core optical fiber are connected in a fusion splice manner, a part of the light field enters the air hole of the single-hole twin-core eccentric core optical fiber, which is referred to as a core mode; since mode fields of the single-mode optical fiber and the single-hole twin-core eccentric core optical fiber do not match, the other part of the light field excites a cladding mode in the single-hole twin-core eccentric core optical fiber and then the cladding mode is transmitted in the single-hole twin-core eccentric core optical fiber, which is referred to as a cladding mode; the core mode and the cladding mode are transmitted to the second fusion splice point and form Mach-Zehnder interference.

Since the single-hole twin-core eccentric core optical fiber has a structure in which a cladding is sandwiched by two layers of air, that is, an air-clading-air structure of three layers, when light is transmitted to the interface between the air and the cladding, a part of the light is transmitted into the air, the other part of the light is reflected back into the cladding; the light reflected back into the cladding and the light transmitted into the air form an anti-resonance effect.

The fast Fourier filtering method is used to filter the comb spectrum formed by the interference between the high-order cladding mode and the core mode out of the superimposed spectrum, and since the high-order cladding mode has a thermo-optic coefficient larger than that of other low-order cladding modes, that is, the high-order cladding mode is more sensitive to the ambient temperature, the high-order comb spectrum filtered out by the fast Fourier filtering method is capable of achieving higher temperature sensitivity. Since the sensitivity is proportional to the resolution, the high-order comb spectrum is capable of achieving high-resolution temperature sensing and suitable for high-precision temperature measurement.

Since in the anti-resonance effect, a main part of the light field is transmitted into the air through the single-hole twin-core eccentric core optical fiber, the temperature sensitivity resulting from the anti-resonance effect depends on the thermo-optic coefficient of the single-hole twin-core eccentric core optical fiber. Since the thermo-optic coefficient is very low, the temperature sensitivity resulting from the anti-resonance effect is low, and thus the temperature resolution is low, making it suitable for large-dynamic-range temperature measurement.

When the ambient temperature changes, the position of the transmission spectrum superimposed on the optical spectrum analyzer will change as a whole; the spectrum data at different temperatures are subjected to fast Fourier filtering and Gaussian fitting, respectively, and then the processed spectrum data are subjected to wavelength demodulation to obtain temperature sensitivities of the two methods; since the temperature sensitivities resulting from the anti-resonance effect and the comb spectrum are greatly different, two sensitivity values obtained by the above two data processing methods has a difference in the order of magnitude, and thus, the two methods are respectively suitable for high-resolution and large-dynamic-range measurement.

Preferably, the single-hole twin-core eccentric core optical fiber has an air hole located at a central position thereof and the air hole has a diameter of 20 μm to 50 μm, so that a part of the light can leak into the cladding of the single-hole twin-core eccentric core optical fiber after the single-hole twin-core eccentric core optical fiber and the single-mode optical fibers are connected in a collapse fusion splice manner, thereby exciting a cladding mode in the single-hole twin-core eccentric core optical fiber. Finally, the cladding mode transmitted in the cladding and the core mode transmitted in the air hole produce interference.

Preferably, two cores of the single-hole twin-core eccentric core optical fiber are respectively suspended on an inner wall of the cladding and inserted in the cladding, and the two cores are disposed on two sides of the air hole, so that after the single-hole twin-core eccentric core optical fiber and the single-mode optical fibers are connected in a collapse fusion splice manner, the light transmitted in the core of the single-mode optical fiber can leak into the cladding and can also be coupled into the two cores for transmission, thereby exciting more different modes to form the inline Mach-Zehnder interference. Finally, a mode that is most sensitive to temperature is obtained by the fast Fourier filtering method, that is, a high-resolution fiber temperature measurement can be achieved.

Preferably, the single-hole twin-core eccentric core optical fiber has a length of 0.8 mm to 1.2 mm, so that the four distinct resonance wavelengths generated by the anti-resonance effect in the single-hole twin-core eccentric core optical fiber are controlled to be within a window range of 1510 nm to 1610 nm, while effectively reducing the loss during optical transmission. In addition, the length can also control the free spectral range of the comb spectrum formed by the inline Mach-Zehnder interference, so that when the fast Fourier filtering method is adopted, more sampling data can be obtained, and thus, a filtered temperature spectrum is obtained more accurately.

Preferably, fast Fourier filtering and Gaussian fitting are performed on the spectrum obtained by the optical fiber temperature sensor to respectively extract a comb spectrum generated by the inline Mach-Zehnder interference and a resonant wavelength formed by the anti-resonance effect, and then wavelength demodulation is performed on the comb spectrum and the resonant wavelength to obtain different temperature sensitivities resulting from two different mechanisms.

The present invention provides an optical fiber temperature sensor achieving high-resolution and large-dynamic-range simultaneous measurement as well as size miniaturization, comprising: a broadband light source, a first optical fiber patch cord, a first single-mode optical fiber, a first fusion splice point, a single-hole twin-core eccentric core optical fiber, a second fusion splice point, a second single-mode optical fiber, a second optical fiber patch cord and a optical spectrum analyzer;

wherein two ends of the first optical fiber patch cord are respectively connected to an output end of the broadband light source and a first end of the first single-mode optical fiber; a second end of the first single-mode optical fiber is connected to a first end of the single-hole twin-core eccentric core optical fiber; a second end of the single-hole twin-core eccentric core optical fiber is connected to a first end of the second single-mode optical fiber; a second end of the second single-mode optical fiber is connected to a first end of the second optical fiber patch cord; a second end of the second optical fiber patch cord is connected to an input end of the optical spectrum analyzer.

The present invention will be further described below in conjunction with an optical fiber temperature sensor achieving high-resolution and large-dynamic-range simultaneous measurement as well as size miniaturization provided in Embodiment 1; as shown FIG. 1, the optical fiber temperature sensor achieving high-resolution and large-dynamic-range simultaneous measurement as well as size miniaturization provided in Embodiment 1 includes a broadband light source 1, a first optical fiber patch cord 2, a first single-mode optical fiber 3, a first fusion splice point 4, a single-hole twin-core eccentric core optical fiber 5, a second fusion splice point 6, a second single-mode optical fiber 7, a second optical fiber patch cord 8 and a optical spectrum analyzer 9; the broadband light source 1 is connected to a first end of the first optical fiber patch cord 2; a second end of the first optical fiber patch cord 2 is connected to a first end of the first single-mode optical fiber 3; a second end of the first single-mode optical fiber 3 is connected to a first end of the single-hole twin-core eccentric core optical fiber 5; a second end of the single-hole twin-core eccentric core optical fiber 5 is connected to a first end of the second single-mode optical fiber 7; a second end of the second single-mode optical fiber 7 is connected to a first end of the second optical fiber patch cord 8; and a second end of the second optical fiber patch cord 8 is connected to the optical spectrum analyzer 9.

Specifically, in the single-hole twin-core eccentric core optical fiber 5 in Embodiment 1, an air hole has a diameter of 40 μm, a fiber cladding has a diameter of 125 μm, and two cores both have a diameter of 9.1 μm; the second end of the first single-mode fiber 3 and the first end of the single-hole twin-core eccentric core optical fiber 5, as well as the second end of the single-hole twin-core eccentric core optical fiber 5 and the first end of the second single-mode optical fiber 7, are connected in a cladding aligning fusion splice manner; the broadband light source 1 and the first end of the first optical fiber patch cord 2, the second end of the first optical fiber patch cord 2 and the first end of the first single-mode optical fiber 3, the second end of the second single-mode optical fiber 7 and the first end of the second optical fiber patch cord 8, and the second end of the second optical fiber patch cord 8 and the optical spectrum analyzer are all connected by a flange using an FC/APC optical fiber connector.

The working principle of the above-mentioned optical fiber temperature sensor achieving high-resolution and large-dynamic-range simultaneous measurement as well as size miniaturization will be described below with reference to Embodiment 1.

Light emitted by the broadband light source 1 is transmitted to the first fusion splice point 4 via the first optical fiber patch cord 2 and the first single-mode optical fiber 3; since the first single-mode optical fiber 3 and the single-hole twin-core eccentric core optical fiber 5 are connected in a cladding alignment collapse fusion splice manner, mode field mismatch occurs at the first fusion splice point 4, so that a part of the core mode transmitted in the first single-mode optical fiber 3 leaks into the cladding and the two cores of the single-hole twin-core eccentric core optical fiber 5, thereby exciting a cladding mode in the single-hole twin-core eccentric core optical fiber 5; the remaining part of the core mode in the first single-mode optical fiber 3 is coupled into the air hole of the single-hole twin-core eccentric core optical fiber 5 and continues to travel forward, a part of the light coupled into the air hole of the single-hole twin-core eccentric core optical fiber 5 will be reflected back and forth in a three-layer structure consisting of the air hole, the cladding and outside air to form an anti-resonant effect; when the light reflected back and forth satisfies the resonance condition, light with some wavelengths will leak into the outside air, thereby forming a resonant wavelength; when the core mode coupled to the single-hole twin-core eccentric core optical fiber 5 and the excited cladding mode are transmitted to the second fusion splice point 6, the core mode and the cladding mode form an inline Mach-Zehnder interference, and the inline Mach-Zehnder interference is superimposed with the anti-resonance effect generated by the single-hole twin-core eccentric core optical fiber 5 and transmitted to the second single-mode optical fiber 7. Finally, the optical signal enters the optical spectrum analyzer 9 via the second optical fiber patch cord 8, and a spectrum, which is formed by superimposing the resonant wavelength generated by the anti-resonant effect in the single-hole twin-core eccentric core optical fiber 5 and the wavelength generated by the inline Mach-Zehnder interference structure, can be observed on the optical spectrum analyzer 9.

Figure 2A:
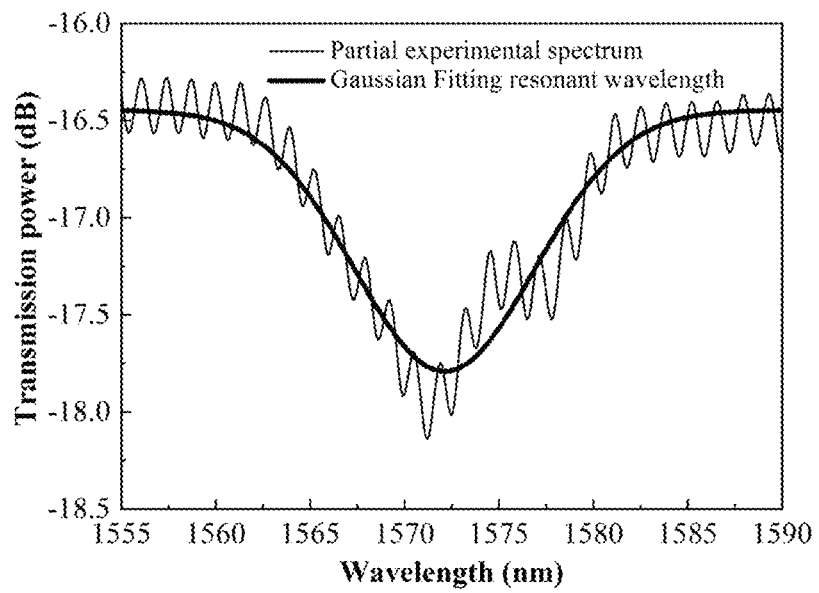
FIG. 2(a) is a diagram showing Gaussian fitting of a part of the superimposed spectrum in a optical spectrum analyzer in Embodiment 1 of the present invention.
Figure 2B:
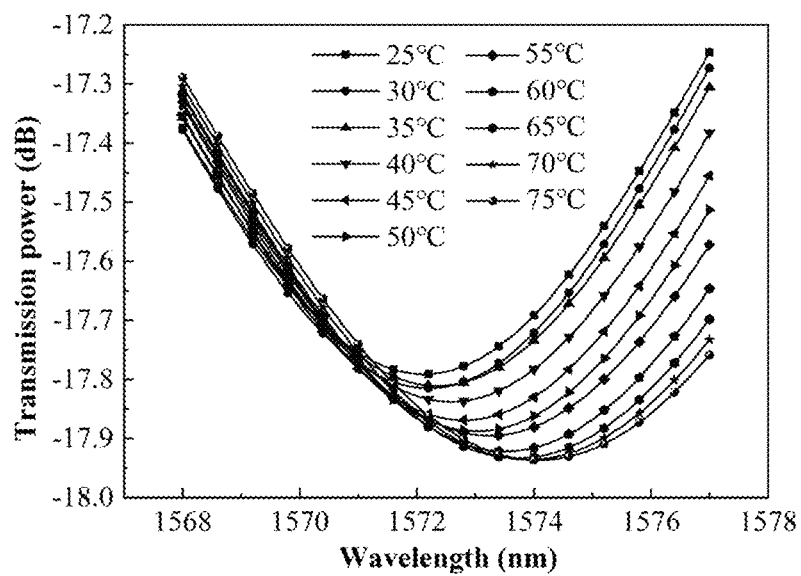
FIG. 2(b) is a diagram showing a red-shift process of Gaussian fitting resonant wavelengths obtained by Gaussian fitting at different temperatures.
Figure 2C:
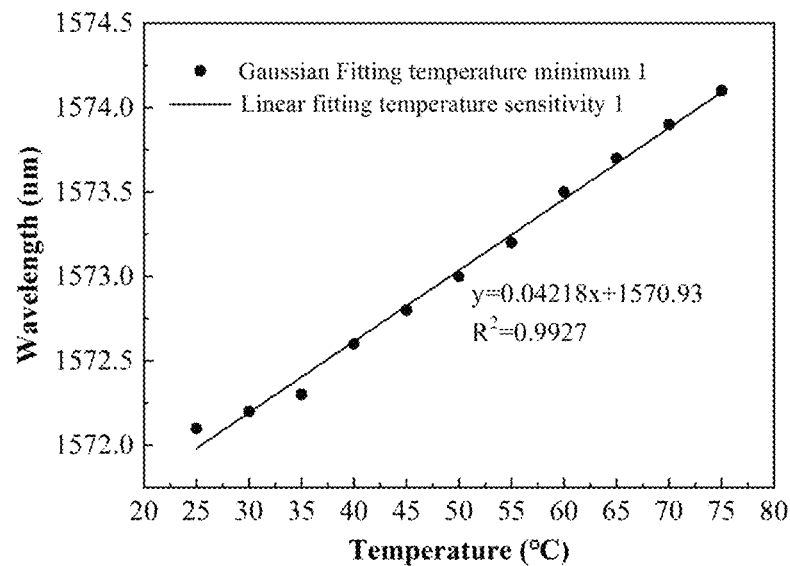
FIG. 2(c) is a diagram showing linear fitting of the drifting process of the Gaussian fitting resonant wavelength.

FIG. 2(a) shows a partial spectrum in the range of 1555 nm to 1590 nm in the integrated spectrum. Gaussian fitting is performed on the spectrum in the range, and the fitted resonant wavelength is the resonant wavelength generated by the anti-resonance effect; FIG. 2(b) shows a phenomenon at different ambient temperatures that the resonant wavelength obtained by Gaussian fitting drifts in the long wavelength direction as the temperature increases gradually; and FIG. 2(c) shows linear fitting of the drifting process, in which resonant wavelength values (i.e., trough values) of the respective curves corresponding to different temperatures are read, and then linear fitting is performed with the temperature as the abscissa and the corresponding resonant wavelength value as the ordinate. The slope of the fitted straight line obtained by linear fitting is the temperature sensitivity, and thus, it can be obtained from FIG. 2(c) that the temperature sensitivity resulting from the anti-resonance effect is 42.18 pm/° C.

Figure 3A:
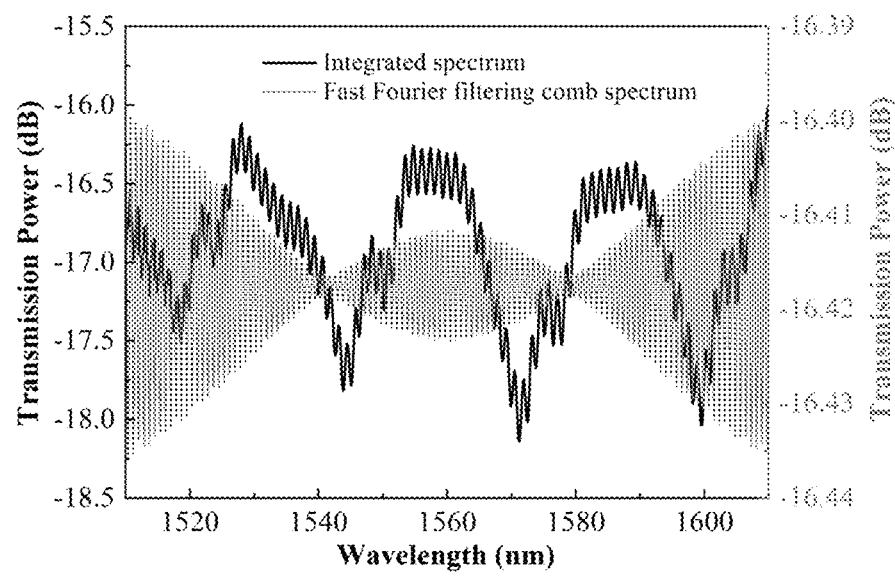
FIG. 3(a) is a diagram showing fast Fourier filtering of the entire superimposed spectrum in the optical spectrum analyzer in Embodiment 1 of the present invention.
Figure 3B:
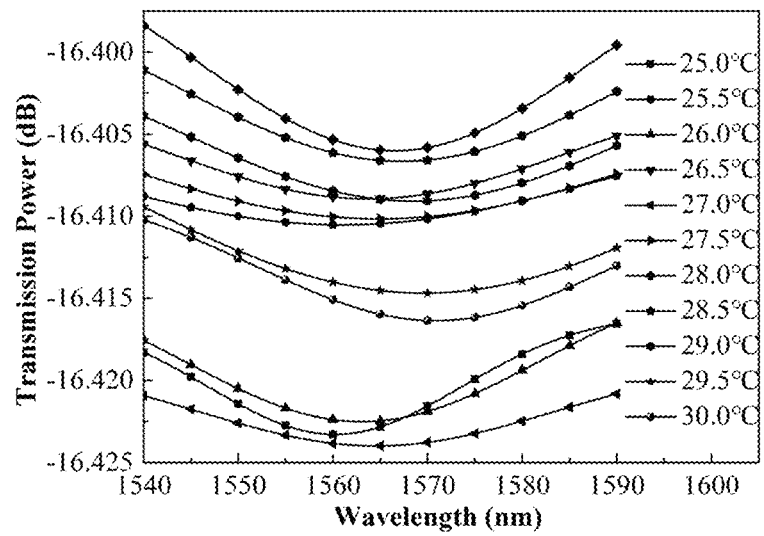
FIG. 3(b) is a diagram showing a red-shift process of the Gaussian fitting comb spectrum envelopes obtained by fast Fourier filtering at different temperatures.
Figure 3C:
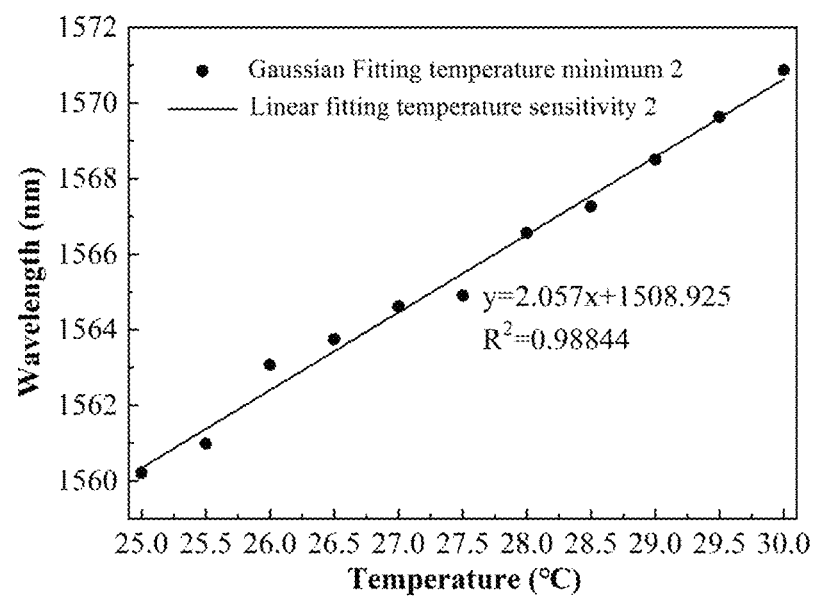
FIG. 3(c) is a diagram showing linear fitting of the minimum values of the Gaussian fitting comb spectrum envelopes.

In FIG. 3(a), the left ordinate value is directed to the integrated spectrum, and the right ordinate value is directed to the comb spectrum obtained by performing fast Fourier filtering on the integrated spectrum; FIG. 3(b) shows Gaussian fitting of the minimum points in the range of 1540 nm to 1590 nm at different temperatures in FIG. 3(a), indicating that the Gaussian fitting curve of the minimum point drifts in the long wavelength direction as the temperature increases gradually; FIG. 3(c) shows linear fitting of the drifting process, in which the minimum points of the respective Gaussian fitting curves corresponding to different temperatures in FIG. 3(b) are read, and then linear fitting is performed with the temperature as the abscissa and the corresponding minimum point as the ordinate. The temperature sensitivity resulting from fast Fourier filtering is 2.057 nm/° C.

When the ambient temperature changes, the effective refractive indexes of the transmission mediums of the three-layer structure for the anti-resonance effect of the single-hole twin-core eccentric core optical fiber 5 in the optical fiber temperature sensor are slightly changed, and by Gaussian fitting of the spectrums on the optical spectrum analyzer 9, it can be found that a drift phenomenon occurs in the resonant wavelength. Through wavelength demodulation, the temperature sensitivity of the optical fiber temperature sensor resulting from Gaussian fitting can be obtained. As shown in FIG. 2(c), the obtained temperature sensitivity is 42.18 pm/° C., a optical spectrum analyzer (AQ6370c) with a resolution of 20 pm is used, and thus, the obtained temperature resolution is 0.474° C. This resolution is low, and thus, the temperature sensitivity resulting from Gaussian fitting is suitable for large-dynamic-range temperature measurement. Similarly, when the ambient temperature changes, the difference in effective refractive index between the core mode and the cladding mode transmitted in the single-hole twin-core eccentric core optical fiber 5 is also changed slightly, so that a drift phenomenon also occurs in the comb spectrum formed by the inline Mach-Zehnder interference.

After fast Fourier filtering is performed on the superimposed spectrum on the optical spectrum analyzer 9, drift distances of the minimum values of the comb spectrum envelopes at different temperatures are extracted. Thus, the temperature sensitivity of the optical fiber temperature sensor obtained by the fast Fourier filtering method is 2.057 nm/° C., and similarly, the obtained temperature resolution is 0.00972° C. This resolution is very high, and thus, the temperature sensitivity obtained by the fast Fourier filtering method is suitable for high-precision temperature measurement. Since the difference between the temperature sensitivities obtained by the above two methods is two orders of magnitude, the temperature sensitivity obtained by the Gaussian fitting method can achieve large-dynamic-range temperature measurement, and the temperature sensitivity obtained by the fast Fourier filtering method can achieve high-resolution temperature measurement. In addition, the actual length of the selected single-hole twin-core eccentric core optical fiber 5 is 950 μm, that is, the optical fiber temperature sensor is miniaturized at the same time.

In summary, the optical fiber temperature sensor achieving high-resolution and large-dynamic-range simultaneous measurement as well as size miniaturization according the present invention can be implemented by the Gaussian fitting method and the fast Fourier filtering method, respectively.

It should be readily understood to those skilled in the art that the above description is only preferred embodiments of the present invention, and does not limit the scope of the present invention. Any change, equivalent substitution and modification made without departing from the spirit and scope of the present invention should be included within the scope of the protection of the present invention.

What is claimed is:

1. An optical fiber temperature sensor, comprising:
    a broadband light source, a first optical fiber patch cord, a first single-mode optical fiber, a single-hole twin-core eccentric core optical fiber, a second single-mode optical fiber, a second optical fiber patch cord and an optical spectrum analyzer;
    two ends of the first optical fiber patch cord are respectively connected to an output end of the broadband light source and an end of the first single-mode optical fiber, the broadband light source is used to provide wide-spectrum light, and the first optical fiber patch cord is used to introduce the wide-spectrum light into the first single-mode optical fiber;
    the other end of the first single-mode optical fiber is connected to an end of the single-hole twin-core eccentric core optical fiber, with the connection point as a first fusion splice point;
    the other end of the single-hole twin-core eccentric core optical fiber is connected to an end of the second single-mode optical fiber, with the connection point as a second fusion splice point, and the first fusion splice point, the single-hole twin-core eccentric core optical fiber and the second fusion splice point are sequentially connected to form an inline Mach-Zehnder interference structure and generate an anti-resonance effect in the broad-spectrum light, wherein impacts of the inline Mach-Zehnder interference structure and the anti-resonance effect on the broad-spectrum light are each related to an ambient temperature of the optical fiber temperature sensor;
    the other end of the second single-mode optical fiber is connected to an end of the second optical fiber patch cord;
    the other end of the second optical fiber patch cord is connected to the optical spectrum analyzer, and the second optical fiber patch cord is used to introduce an optical signal formed by superimposing the inline Mach-Zehnder interference structure and the anti-resonance effect into the optical spectrum analyzer, so that the optical spectrum analyzer determines an ambient temperature of the optical fiber temperature sensor according to the optical signal.

2. The optical fiber temperature sensor according to claim 1, wherein the optical spectrum analyzer performs fast Fourier filtering on the optical signal to filter a comb spectrum formed by interference between a high-order cladding mode and a core mode out of the superposed spectrum, and since the high-order cladding mode has a thermo-optic coefficient greater than that of a low-order cladding mode, the high-order comb spectrum filtered out by the fast Fourier filtering method is capable of achieving high temperature sensitivity;

the optical spectrum analyzer performs Gaussian fitting on the optical signal, and since temperature sensitivity resulting from the anti-resonance effect depends on a thermo-optic coefficient of a cladding of the single-hole twin-core eccentric core optical fiber and the thermo-optic coefficient of the cladding is very low, the temperature sensitivity resulting from the anti-resonance effect is low;

the optical spectrum analyzer performs fast Fourier filtering and Gaussian fitting on the optical signal respectively to determine a minimum point wavelength in the comb spectrum and a resonant wavelength, and the optical spectrum analyzer determines an ambient temperature of the optical fiber temperature sensor according to a relationship between the minimum point wavelength in the comb spectrum and temperature as well as a relationship between the resonant wavelength in the optical signal and temperature, in which a sensitivity resulting from change of the minimum point wavelength in the comb spectrum with the ambient temperature is a first temperature sensitivity, a sensitivity resulting from change of the resonant wavelength in the optical signal with the ambient temperature is a second temperature sensitivity, the first temperature sensitivity is greater than the second temperature sensitivity and the two are of different orders of magnitude, enabling the optical fiber temperature sensor to be suitable for high-resolution and large-dynamic-range temperature measurement.

3. The optical fiber temperature sensor according to claim 1, wherein that two ends of the single-hole twin-core eccentric core optical fiber are respectively connected to the other end of the first single-mode optical fiber and the end of the second single-mode optical fiber in a cladding alignment fusion splice manner, and the first fusion splice point and the second first fusion splice point are both collapsed fusion splice points.

4. The optical fiber temperature sensor according to claim 1, wherein that the single-hole twin-core eccentric core optical fiber has an air hole located at a central position thereof, and the air hole has a diameter of 20 μm to 50 μm.

5. The optical fiber temperature sensor according to claim 1, wherein that two cores of the single-hole twin-core eccentric core optical fiber are respectively suspended on an inner wall of the cladding and inserted in the cladding, and the two cores are disposed on two sides of the air hole.

6. The optical fiber temperature sensor according to claim 1, wherein that the cores and the cladding of the single-hole twin-core eccentric core optical fiber have the same diameters as that of a common single-mode fiber.

7. The optical fiber temperature sensor according to claim 1, wherein that the single-hole twin-core eccentric core optical fiber has a length of 0.8 mm~1.2 mm.

\* \* \* \* \*